United States Patent [19]

Ellwood

[11] 4,053,144

[45] Oct. 11, 1977

[54] DELTA ROTOR THROUGH FEED MIXER

[75] Inventor: Henry Ellwood, Rochdale, England

[73] Assignee: USM Corporation, Boston, Mass.

[21] Appl. No.: 690,730

[22] Filed: May 27, 1976

[30] Foreign Application Priority Data

May 29, 1975  United Kingdom ............... 23408/75
Apr. 22, 1976  United Kingdom ............... 16292/76

[51] Int. Cl.² .................................................. B29B 1/06
[52] U.S. Cl. .................................... 366/97; 366/298
[58] Field of Search ............... 259/191, 192, 193, 194, 259/185, 195, 5, 6, 21, 40, 41, 104, 178 R; 425/207, 208, 209

[56] References Cited

U.S. PATENT DOCUMENTS

| 2,573,825 | 11/1951 | Banousky | 259/6 |
|---|---|---|---|
| 3,387,826 | 6/1968 | Loomans | 259/6 |
| 3,746,318 | 7/1973 | Schippers | 259/191 |
| 3,804,382 | 4/1974 | Pultz | 259/192 |
| 3,889,932 | 6/1975 | Brandis | 259/191 |

*Primary Examiner*—Robert W. Jenkins
*Attorney, Agent, or Firm*—Donald N. Halgren; Richard B. Megley; Vincent A. White

[57] ABSTRACT

A through feed mixer for mixing and plasticizing a variety of materials has a pair of coaxially disposed rotors in a mixing chamber. The rotors are without helical twist but each have a mixing section which is derived from a regular n-sided polygon comprising n similar peripheral portions, n preferably being 3. Each rotor may have a gradual taper to its body portions. The mixer also includes a feeding device adapted to supply material to be mixed to an inlet portion of the mixing chamber under substantially constant pressure, and an outlet end portion transferring mixer material to an extrusion device.

5 Claims, 12 Drawing Figures

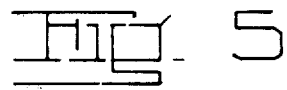
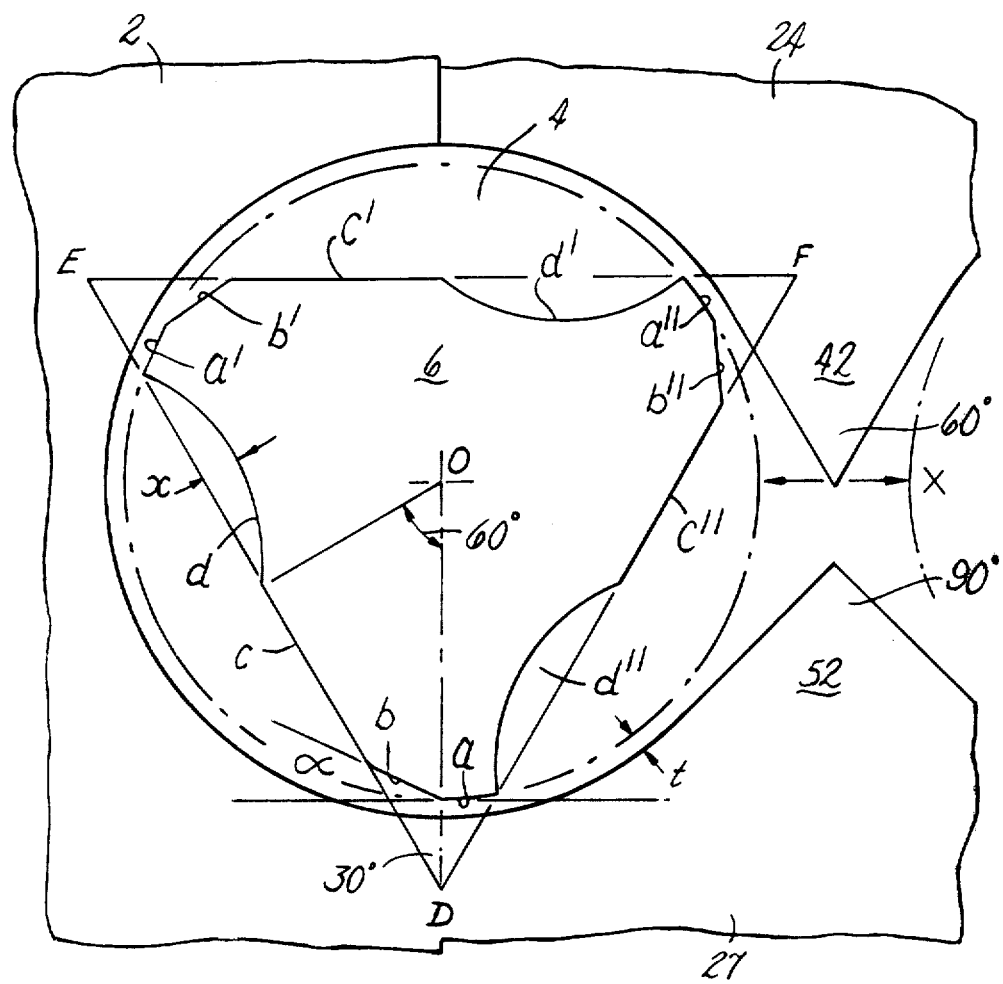

DELTA ROTOR THROUGH FEED MIXER

BACKGROUND OF THE INVENTION

1. Field of the Invention

The present invention is concerned with improvements in or relating to extruders and through feed mixers.

2. Prior Art

Through feed mixers, which are adapted to mix plastics and rubbery materials and provide a continuous supply of well mixed and plasticized materials, are becoming more common in the plastics and rubber industries, replacing to some extent the traditional batch mixer, e.g. of the "Banbury" type.

There are two commonly proposed types of through feed mixers at present in use. The first comprises an extrusion type screw, usually of a long L/D ratio, to which material is fed and in which the material is mixed and then extruded to give a desired product. It is possible to design such a screw so that it will perform well on a particular grade of material, but the design is very critical, and small variations in the material will substantially affect the mixing performance of the screw. To give the mixer any degree of versatility, a collection of screws of different characteristics is needed. Additionally, both the specific work put into material passed through the mixer and the output of the mixer are determined by the rate of rotation of the screw.

The second type of mixer, an example of which is disclosed in U.S. Pat. No. 3,154,808, comprises two parallel rotors comprising mixing and feeding sections. In such mixers, which are generally known as continuous mixers, the output is largely dependent on the amount of material fed to the mixer, and is, for a wide range of outputs, almost independent of the speed of the rotors. However, continuous mixers usually work in conjunction with other equipment, such as extruders, and it is in practice extremely difficult to ensure that the output of the mixer is precisely correct for the input of the extruder or the like. French Pat. No. 2,204,446 describes a mixer device utilizing parallel, circular eccentrically rotated, or generally oval-shaped rollers or screws that are tapered from their inlet ends to their outlet ends.

One of the various objects of the present invention is to provide an improved mixer which can readily be arranged to supply mixed plastics or similar material at a desired rate.

Another of the various objects of the present invention is to provide an improved mixer in which the specific work put into mixed plastic or similar material can be readily altered.

BRIEF SUMMARY OF THE INVENTION

A mixing apparatus comprising the present invention is a through feed mixer and extruder adapted to receive rubbery or plastics material in powder or granular form. The mixer is arranged to mix the material thoroughly and to plasticize it by the input of work thereto and to supply the mixed and plasticized material for further processing. The invention comprises a mixing device comprising two rotors each having mixing sections of uniform cross section without helical twist. The rotors are mounted for rotation parallel to each other in a mixing chamber. A feeding device is adapted to supply material to be mixed to an inlet end portion of the mixing chamber under a substantially constant pressure. An extrusion device which receives mixed material from the chamber of the mixing device extrudes the material for further processing. In the operation of the mixing apparatus, granular material is placed in a funnel of the feeding device and a plunger of the device is caused to reciprocate, supplying the material under a substantially constant pressure to the mixing chamber. The rotors in the mixing chamber are contra rotating at slightly different speeds and the material passes through the mixing chamber to an outlet passage leading to the extrusion device.

The rotors of the present invention are of a special cross section which is derived from an equilateral triangle. The periphery of each rotor comprises three similar peripheral portions; each peripheral portion comprises a first narrow section which is substantially circular about the axis of the rotor, a second leading section joining the narrow section which is flat and which leads into the first section to provide an acute angle between the second section and the circle defining the outer periphery of the rotor, and a third section which is provided by one of the sides of the triangle. Extending from the third section to the first section of the next peripheral portion is a circular section which provides a relief section falling entirely within the periphery of the equilateral triangle.

Each rotor also comprises dams which divide the rotor into mixing sections having the periphery discussed above. These dams are of a radius equal to that of the first narrow sections of the rotors and are of uniform thickness. The dams on one rotor are staggered with respect to those on the other. When the inventive apparatus is in use, the two rotors are rotated in contrary directions and the feeding device is caused to operate to feed material to be mixed into the mixing chamber under a substantially constant pressure. The rotors having no helical twist have little tendency to feed material to the outlet apart from the squashing action on the material which passes to the outlet as a result of this squashing action and the pressure exerted by the feeding means. Once a steady state has been reached, the material passes slowly through the chamber and the feeding of material out from the chamber is determined by the takeup rate of the extrusion device. The cross-sectional area of each rotor may alternately taper from their input feed ends to their outlet ends.

There is in the present mixing device, contrary to those prior mixers with an element of screw feed, little or no tendency to pack material towards the outlet during the mixing operation and thus the amount of material per unit cross section in the mixing chamber is approximately uniform along the length of the rotors. It is possible that there are always substantial voids in the material being mixed which allows for very effective venting of the material.

The performance characteristics of the invention are very different from those of previously proposed through feed mixers. The throughput of the apparatus is determined by the rate at which the extrusion device operates to take off material, provided of course that sufficient material to be mixed is supplied by the feeding device. The rotor speed has little effect on the throughput but increasing the rotor speed increases the work done on the material. The feeding device pressure together with the throughput rate also influences the work done on the material.

While the invention comprises a mixing device feeding a screw extrusion device, it will be realized that a similar mixing device could be arranged as a through feed mixer to feed other types of devices.

Although the feeding device of the invention comprises a reciprocating plunger, it will be realized that a feeding device adapted to exert a substantially constant pressure may be provided which comprises screw means to feed material. Also, while the illustrative machine is adapted to operate with powdered and granular material, a feeding device adapted to feed strips or lumps of material under substantially constant pressure may also be used.

As already discussed, the rotors comprise a regular n-sided polygon as an equilaterial triangle, i.e., $n$ is three. In large mixers it may be advantageous to have rotors where $n$ is four. In general there is no further advantage in having $n$ greater than four.

BRIEF DESCRIPTION OF THE DRAWING

There now follows a detailed description of the invention to be read with reference to the accompanying drawings. It is to be understood that these embodiments of the invention have been selected for description to illustrate the invention by way of example only, and not by way of limitation thereof.

In the accompanying drawings:

FIG. 5 is a cross sectional view of a rotor showing its profile in detail;

DESCRIPTION OF THE PREFERRED EMBODIMENT

Figure 1:
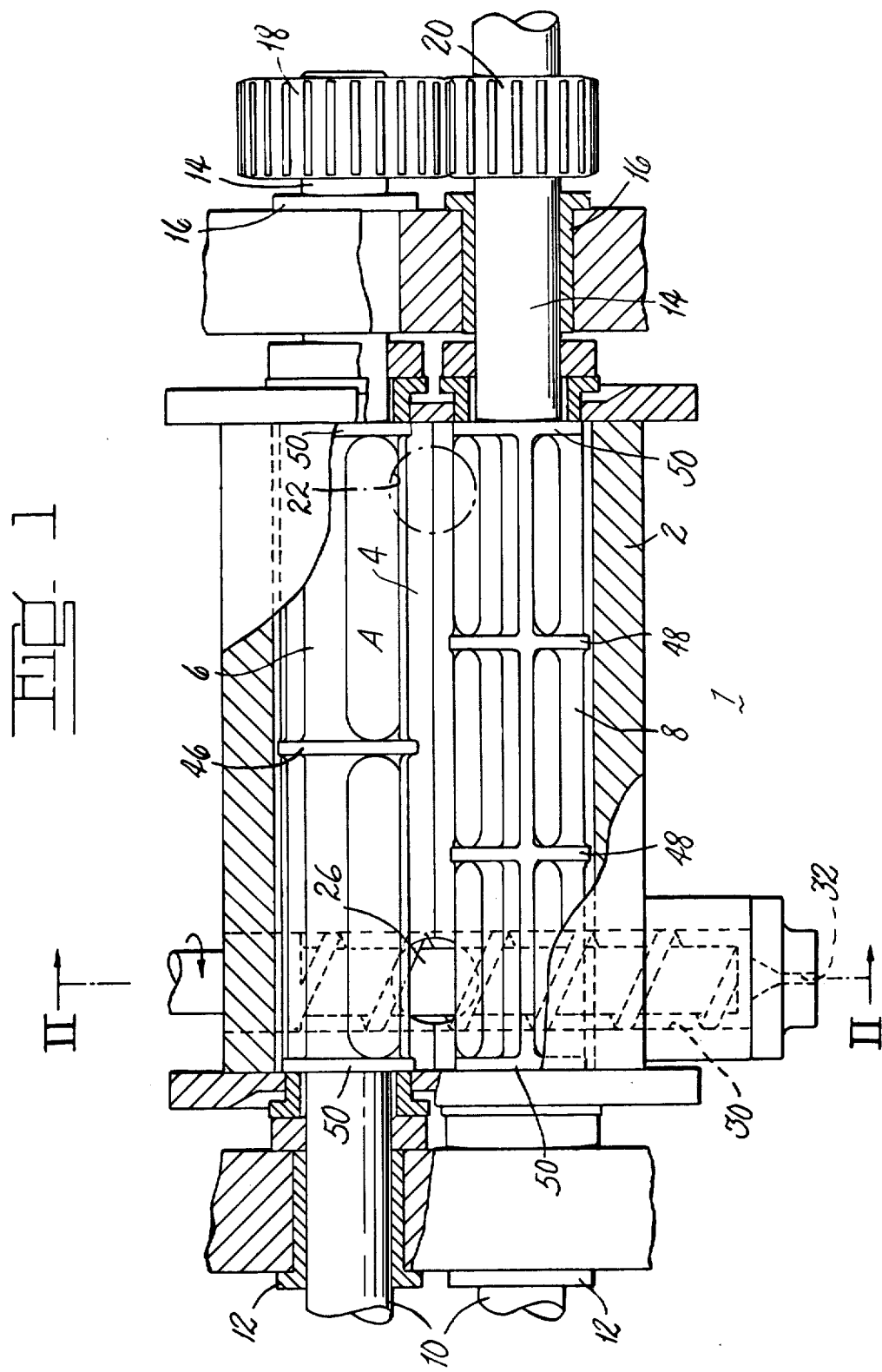
FIG. 1 is a diagrammatic plan view of the invention, with certain parts cut away.

Referring to the drawings in detail, and particularly to FIG. 1, there is shown a through feed mixer and extruder machine 1, which is adapted to receive a rubbery or plastics material in powder or granular form, to mix the material thoroughly and to plasticize it by the input of work thereto and to supply the mixed and plasticized material for further processing.

Figure 2:
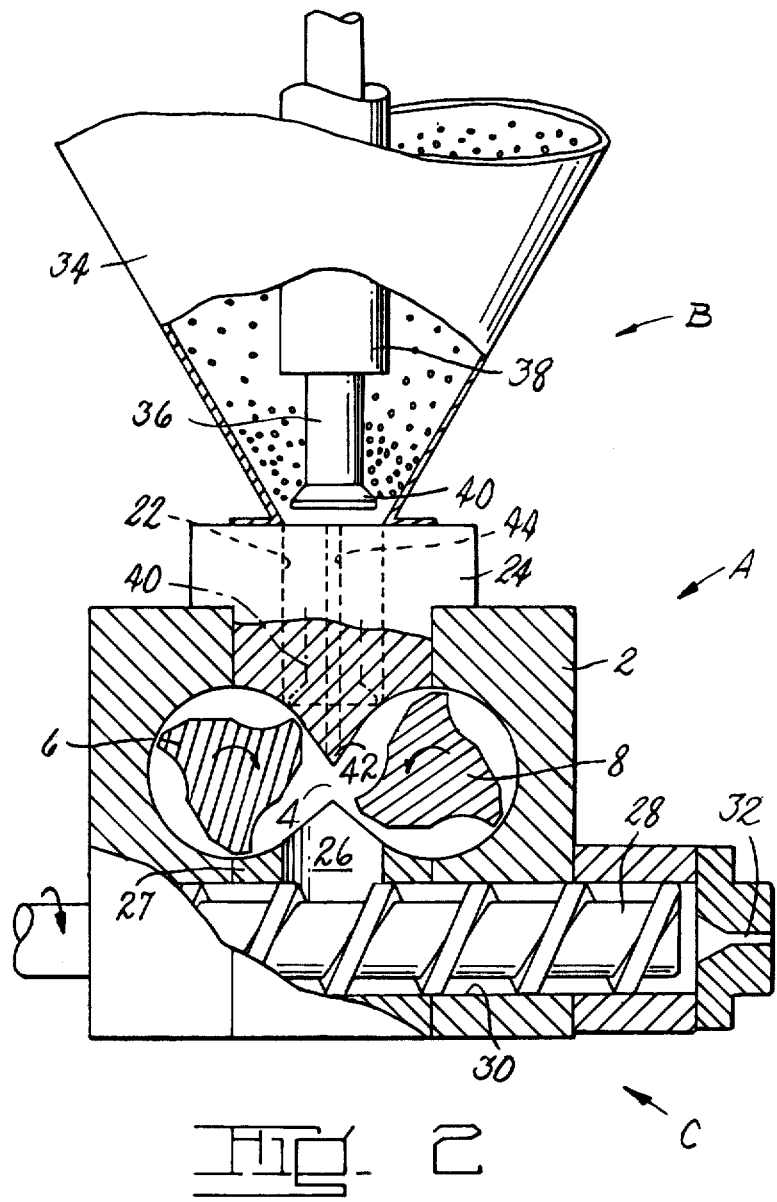
FIG. 2 is a diagrammatic section taken along the line II—II of FIG. 1 and adding a feeding device.

The machine 1 comprises a mixing device A, comprising a pair of rotors 6 and 8 each being without helical twist and having mixing sections of a generally uniform cross section, the rotors being mounted for rotation parallel to each other in a mixing chamber 4. A feediing device B, shown in FIG. 2 is adapted to supply material to be mixed to an inlet end portion of the mixing chamber 4 under a substantially constant pressure. An extrusion device C receives mixed material from the chamber 4 of the mixing device A and extrudes it for further processing.

The mixing device A includes a composite body portion 2 which comprises the mixing chamber 4, having a generally "8" shaped cross-section, the chamber 4 extending horizontally. The two rotors 6 and 8 which are mounted for rotation in the chamber 4 have forwardly extending bearing portions 10 supported in bearings 12, and rearwardly extending bearing portions 14 supported in bearings 16. An arrangement of intermeshing gears 18,20 on the rearwardly extending bearing portions 14 of the rotors 6 and 8 respectively provide part of a drive mechanism (not shown) arranged to drive the rotors in opposite directions at a ratio of approximately 26:29.

A circular vertically disposed inlet passage 22, shown in FIG. 2, is provided in an upper portion 24 of the body portion 2 and leads to inlet end portion of the chamber 4. A circular vertically disposed outlet passage 26 is provided in a lower portion 27 of the body portion 2 and leads from an outlet end portion of the chamber 4 to a transverse extruder screw 28 of the extrusion device which is mounted under the rotors 6 and 8 in a transverse chamber 30 provided in the body portion 2. The chamber 30 has an extrusion orifice 32.

The feeding device B comprises a funnel 34 which is mounted on the upper portion 24 of the body portion and which leads to the inlet passage 22. Mounted in the funnel 34 is a plunger 36 which is mounted for reciprocating axial movement in a sleeve 38 between an upper position, where a head 40 of the plunger is in contact with the sleeve 38, and a lower position, as shown in phantom lines in FIG. 2 just clear of the mixing chamber 4. The plunger 36 is moved axially up and down in the operation of the machine by a pneumatic power device (not shown) and this device, the funnel 34 and the plunger 36 together provide means for supplying granular material in the operation of the illustrative apparatus under a substantially constant pressure to the inlet passage 22.

In the operation of the through feed extruder and mixing machine 1, granular material, which may be polyethylene together with pigment, is placed in the funnel 34. The plunger 36 is caused to reciprocate, moving downwards under a substantially constant pressure until it reaches its lower position and then returning more rapidly to its upper position, there to begin moving downwards again, pushing granular material under substantially constant pressure into the chamber 4. The contra rotating rotors 6 and 8 masticate and mix the material which is forced, both by the action of the rotor and the pressure exerted from the inlet passage 22, to move along the chamber 4 to the outlet passage 26, where it passes to the chamber 30 and is extruded through the orifice 32 by the screw 28. It will be noted that the outlet passage 26 is of substantial size, and as previously mentioned, it is circular in cross section, and it thus offers little resistance to the passage of material through it. The thread of the screw 28 is a left hand thread, and thus the rotation of the screw 28, as shown in FIG. 2, tends to pull material down through the passage 26 in a manner which assists the passage of material through the chamber 4. It should be noted that the screw 28 could have a right hand thread, and rotate opposite to that shown, and be equally as effective.

The machine 1 is provided with conventional means for controlling the temperature of the various parts of the apparatus while it is in use. In general the mixing chamber is maintained at a temperature which is somewhat lower than the temperature developed in the mixed material, so that heat may flow away from the material, but above the temperature at which there is any risk of the material freezing. In the present invention, separate temperature controls are provided for a. the rotors 6 and 8;
b. the material of the body portion 2 providing the upper half of the chamber 4;
c. the material of the body portion 2 providing the lower half of the chamber 4;
d. the barrel of the extrusion device C, and
e. the extrusion screw 28.

The machine 1 is also provided with means for venting the mixing chamber 4 and the extrusion chamber 30. The venting of the mixing chamber 4 is by means of vents 44 arranged along the center line of a portion 42 of the upper portion 24 of the body portion 2, which portion 42 descends as a cusp between the two rotors 6 and 8. As wil be realized, when the apparatus is in operation material is pulled by the rotors down, away from the cusp portion 42, thus minimizing the risk of any material being forced into the vents 44. Normally, the vents 44 merely comprise bores leading to the atmosphere. If the machine 1 is used to mix material which may emit noxious vapour (for example, vinyl chloride monomer), the vents 44 may be connected to a vacuum source, but in this case, the feeding device B must also be arranged to operate under a vacuum seal, as there is normally a free passageway for gases when the apparatus is in use lengthwise backwards through the chamber 4. Alternatively, the vents 44 may be provided with spring loaded plungers, allowing an adjustable venting pressure: these plungers can ride on the material in the chamber 4 because, as already explained, there is a minimal tendency for such material to be forced up the vents.

The extruder device C is also provided with venting means. This comprises a vent leading into the chamber 30 rearwardly of the outlet passage 26, but further vents may be provided forwardly of the passage 26 if desired.

A cross section of the rotor 6 is shown in FIG. 5. The cross section is derived from an equilateral triangle DEF and as can be seen the periphery of the rotor comprises three similar peripheral portions $a\ b\ c\ d$, $a'b'c'd'$, and $a''b''c''d''$. The peripheral portion which begins near the apex D comprises a first narrow section $a$ which is circular about the axis O of the rotor. Joining the narrow section $a$ is a second, leading, section $b$, which is flat and which leads into the first section to provide an acute angle, $\alpha$, between the section $b$, and the tangent to $a$ at the point where the two sections $a$ and $b$ join. On the rotor 6 the angle $\alpha$ is 25°. Joining the leading section $b$ is a third section $c$ which as can be seen, is provided by one of the sides of the triangle DEF. In the rotor 6 the section $c$ extends to a point which subtends an angle of 60° at the axis O with the line joining the axis to the join of $a$ and $b$. Extending from the section $c$ to the section $a'$ of the next peripheral portion is a circular section $d$ which provides a relieved section falling entirely within the periphery of DEF. The other two peripheral portions $a'b'c'd'$ and $a''b''c''d''$ are similarly arranged. The cross section of the rotor 8 is a mirror image of the rotor 6.

The rotor 6 comprises, as shown in FIG. 1, halfway along its length and dividing the rotor into two mixing sections, a circular dam 46 which is of a radius equal to that of the sections $a$, $a'$, $a''$ and is of uniform thickness. The rotor 8 comprises two similar dams 48,48 which divides the rotor 8 into three mixing sections, each generally comprising an elongated polyhedron whose planes parallel to the axis of rotation form apexes along their line of intersection. A flange 50, similar to the dams and disposed at each end of the two rotors, assist in providing end seals to the rotors From FIG. 5 it can be seen that the '8' shaped chamber 4 comprises the cusp portion 42 which descends downward between the rotors and a similar cusp portion 52 which extends upwardly. The portion 42 extends nearer to the closest point of approach X of the rotors than does the portion 52, the first including an angle of 60° while the second includes an angle of 90°.

In the embodiment described, the diameter of each rotor is about 2¼inches, the distance $t$ between the outer diameter of the rotor and the inner circular surface of the chamber 4 is about 1/16 inch, the closest distance of approach of the rotors at X is about ⅛inch and the length of each first narrow section ($a$, $a'$, $a''$) of the peripheral portion is about 0.2 inch. The length/diameter ratio of the rotor is abot 4.4/1.

Figure 3:
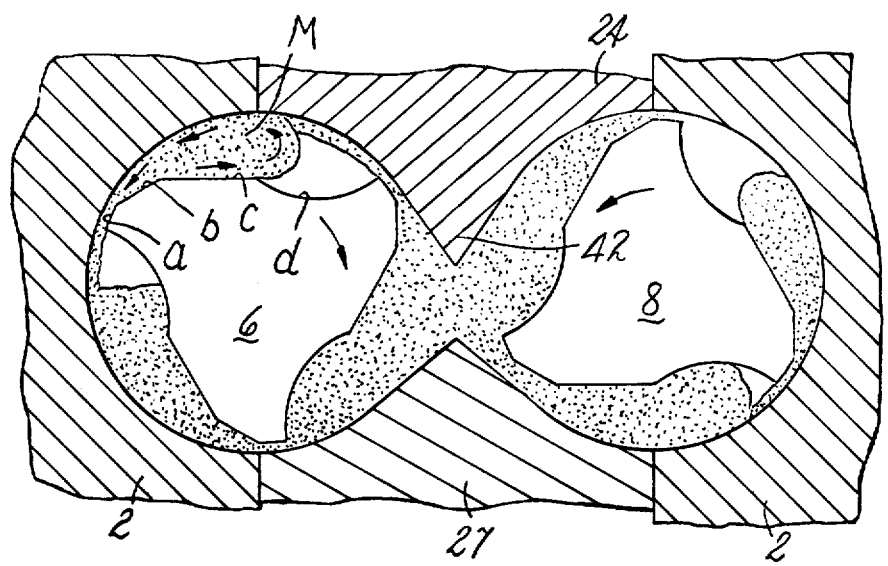
FIG. 3 is a diagrammatic cross section of the rotors shown in FIG. 2, showing material in the apparatus at a fill factor of about 90%.
Figure 4:
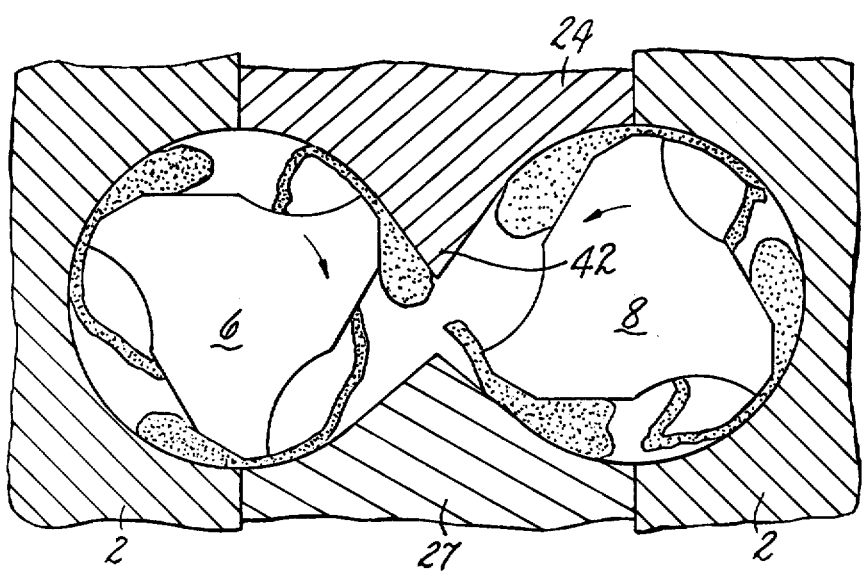
FIG. 4 is a diagrammatic cross section corresponding to FIG. 3 but showing material in the apparatus at a fill factor of about 30%.

When the machine 1 is in use, the two rotors are rotated in contrary directions, as indicated in FIGS. 2, 3 and 4. The funnel 34 is filled with material to be mixed, for example, polyethylene and pigment, and the feeding device is caused to operate to feed the material into the chamber 4 under a substantially constant pressure. The rotors 6 and 8, having no helical twist at all, have little tendency to feed material in the chamber 4 from the inlet to the outlet, apart from a squashing action on the material as they rotate, and the material passes along the chamber to the outlet 26 as a result of this squashing action and the pressure exerted by the feeding means. The rotors 6 and 8 have mixing sections which are defined by the dams 48, and/or the flanges 50, and which are comprised of the linearly extending apexes that are the radially outermost edges of the mixing portions of the rotors 6 and 8. The apexes are parallel with one another, and with the axis of rotation of each rotor. Once a steady state has been reached, the material passes slowly through the chamber to the outlet 26, which is filled, and the feeding of material out from the chamber is determined by the take up rate of extrusion screw 28.

By appropriate adjustment of the take up rate by the extrusion screw 28 and the pressure of the feeding device B, the extent to which the chamber 4 is filled with material can be determined. There is, in the embodiment shown, contrary to those mixers with an element of screw feed, little or no tendency to pack material towards the outlet during the mixing operation, and thus the amount of material per unit cross section is approximately uniform along the length of the rotors (except of course adjacent the dams 46 and 48). The "Fill Factor" of the apparatus is defined as 100 × the ratio of the volume of material in the mixing chamber to the effective volume of the chamber. FIG. 3 shows a diagrammatic cross section of the chamber at a fill factor of about 90%. FIG. 4 shows a similar cross section at a fill factor of about 30%.

The mixing and plasticizing action of the rotors is understood to be as follows, with reference to FIG. 3. As the rotor 6 rotates, the material in the bank M is led by leading section b to the narrow space between the circumference of the chamber and the section a. Some of the material is squeezed through this space while the rest of the bank M, under the influence of drag and frictional forces is caused to circulate as shown by the arrows, the mixing and shear stresses thus being effected. As the rotors rotate some material is passed from one rotor to the other, thus increasing the mixing effect, and the passage of material from one rotor to the other is increased by the operation of the dams: it will be seen that the bulk of the material passing along the rotor 8 must, when it reaches the dam 48, pass to the rotor 6 before it can proceed further. This transfer of material from one rotor to the other ensures very effective mixing.

It can be seen that with a fill factor of less than 100%, there are always substantial voids in the material being mixed. Any gases expelled from the material during mixing tend to collect in the voids (rather than, as is often the case in a completely filled mixer, absorbed in the material so that on later decompression porous material is formed). Venting of gases from these voids takes place simply through the vents 44.

Figure 7:
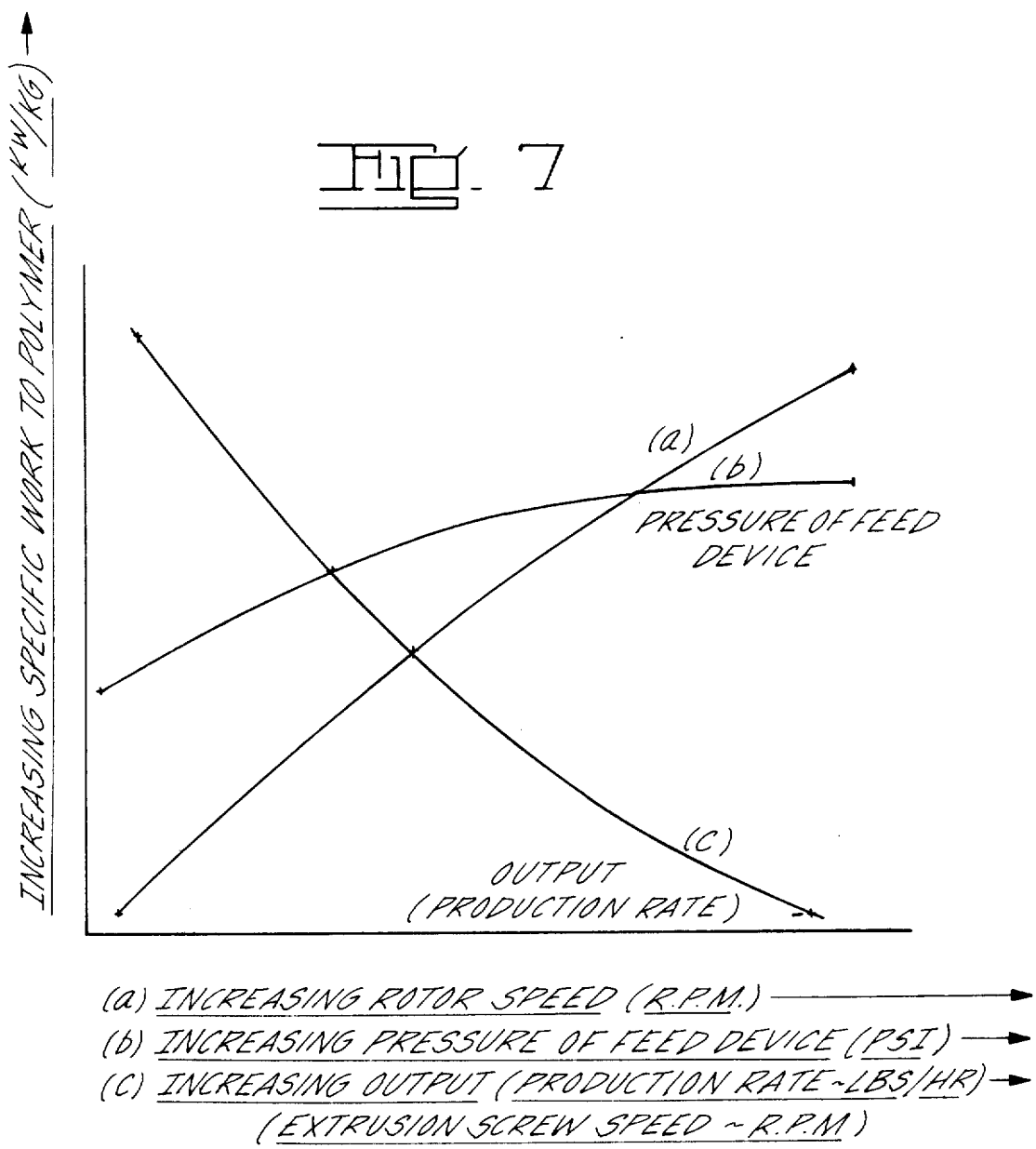
FIG. 7 is a diagram illustrating the effect of working certain adjustments of the invention.

The performance characteristics of the machine 1 are, because of its mode of operation, very different from those of previously proposed through feed mixers. The throughput of the apparatus is determined by the rate at which the extrusion screw operates (provided, of course, that sufficient material to be mixed is supplied by the feeding device). The rotor speed has little effect on the throughput, but increasing the rotor speed increases the work done on the material. The feed device pressure, together with the throughput rate, does also infuence the work done on the material. FIG. 7 shows schematically the effect on the specific work done on the polymer of varying a. the rotor speed;
b. the pressure of the feed device; and
c. the output;

while keeping the other factors constant. The figures below also give an indication of this effect.

possible to vary the shape and still obtain very desirable mixing effects -with certain polymers possibly even better.

In a rotor based on an equilateral triangle (as shown in FIG. 5), the length of the first narrow section a of the peripheral position delivers the amount of "smearing" action effected by the rotor: a longer section a will require a greater power input for the same rate of rotation. While it is preferred that the section a is circular it could, if desired, be flat. The angle at which the section b meets the section a is preferred to be 25°, as in the preferred embodiment, but provided the portion b provides a wedge shaped lead in to the section a the angle may vary between 5° and 45°. It will be realized that the section b has to be very short if the angle is as small as 5°. The size of the section c is not critical, nor is the size of the relieved section d. Indeed it may be preferred to dispense with the relieved section d, although in general its provision has been found to reduce parasitic drag - i.e., drag of material on the rotor which does not effect any substantial mixing.

Further while in the embodiment of the present invention, the distance of closest approach between the rotors is ⅛ inch, it may be preferable to reduce this distance, to obtain more effective mixing, to about 1/10 inch. Again, the clearance between the rotors and the internal surface of the chamber 4 is about 1/16 inch. This distance is preferably increased with larger rotors, to about 1/10 inch with a 5 inch diameter rotor and about 5/8 inch with a 24 inch diameter one. When the rotors are larger it is possible to reduce the L/D ratio of the rotors without losing effective mixing.

One point which will be readily realized is that the rotors 6, 8 of the present invention are far simpler and cheaper to manufacture than those for conventional plastics mixers. This is because, apart from the dams, the cross section of the rotors is constant and without helical twist. Faces on the rotors can thus be simply formed by conventional machining operations, and the amount of complex machining and hand finishing is greatly reduced.

| Rotor Speed (6) | RPM | 327 | 327 | 327 | 327 | 327 | 245 | 327 | 411 |
|---|---|---|---|---|---|---|---|---|---|
| Feed Pressure | PSI | 10 | 15 | 20 | 15 | 30 | 15 | 15 | 15 |
| Output Rate Kgm/hr | | 23.4 | 8.5 | 23.86 | 35.79 | 23.86 | 23.86 | 23.86 | 24.71 |
| Specific Work Kw/kg | | 0.592 | 1.5 | 0.639 | 0.503 | 0.660 | 0.46 | 0.60 | 0.708 |

The subject invention is thus a very versatile machine which can be adjusted to put the desired specific work into a polymer independently of the rate at which the polymer is mixed. The machine 1, though small, is capable of proportionately large throughputs of polymer while obtaining very effective mixing- for example, throughputs of up to 70 Kgms of polymer per hour have been obtained with excellent mixing.

A very useful mixer may be constructed by incorporating a feeding device and rotors similar to those used in the present invention in apparatus in other respects similar to that described in our co-pending U.S. Patent application Ser. No. 647,511, filed Jan. 8, 1976. This apparatus allows for the ready removal of the rotors from the chamber in which they rotate, and also comprises an extruding device so arranged that, by reverse rotation of the extruder screw, ready discharge of an initial, less well mixed, portion of material passed through the apparatus, may be achieved.

Figure 6:
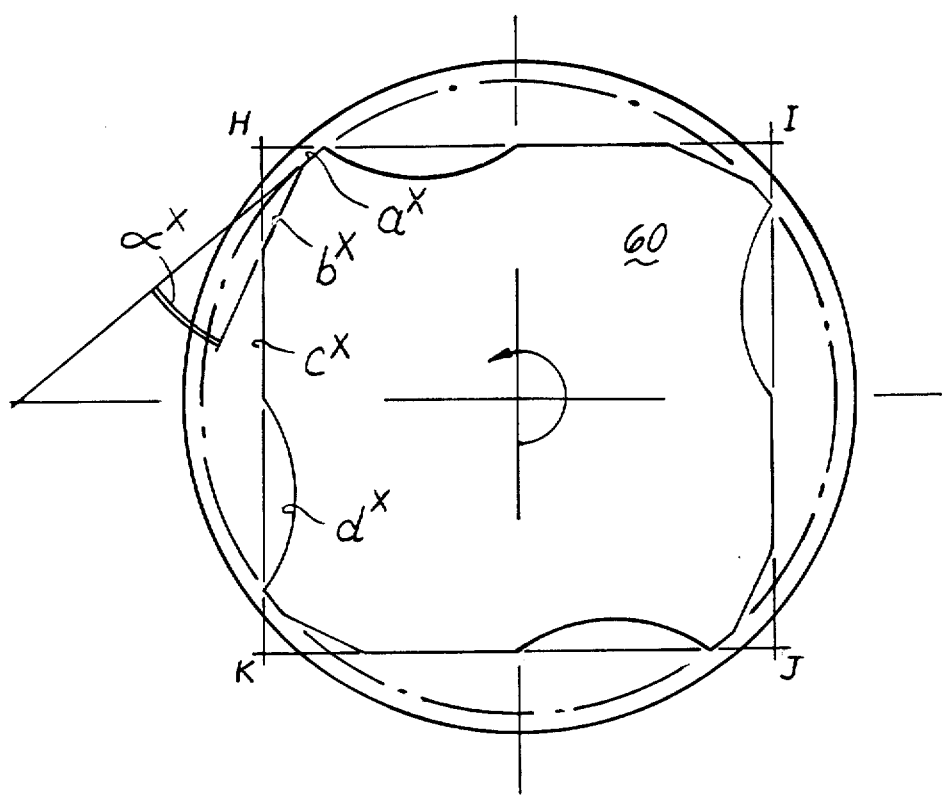
FIG. 6 is a cross sectional view of an alternative form of rotor.

While the shape of rotor in the preferred embodiment of the present invention is a very effective one, it is A rotor, according to the invention, may be based on a regular polygon other than an equilateral triangle. In large mixers, it may be advantageous to have a rotor 60 based on a square in an alternative embodiment, as shown in FIG. 6. Rotors based on pentagons and hexagons are feasible and would work, but because of the approximation of such rotors to a circular outline, the capacity of a mixer utilizing them would be undersirably small.

The rotor 60 shown in FIG. 6 has a cross section derived from square HIJK and as can be seen the periphery of the rotor comprises four similar peripheral portions, one of which is indicated as $a^x b^x c^x d^x$. This peripheral portion comprises a first narrow section $a^x$ which is circular around the axis of the rotor. Joining the narrow section $a^x$ is a leading section $b^x$, which is flat and at an acute angle $a^x$ to the section $a^x$, measured from the tangent to $a^x$ at the point where the two sections $a^x$ and $b^x$ join. In the rotor 60, $a^x$ is about 25°. Joining the leading section $b^x$ is a third section $c^x$ which, as can be seen, is one of the sides of the square HIJK. In the rotor 60, $c^x$ extends to a point where the radius of the rotor is perpendicular to $c^x$. Extending from the section $c^x$ to the narrow section of the next peripheral portion is a circular section $d^x$ which provides a relieved section falling entirely within the periphery of HIJK.

From the earlier discussion it will be understood that the profile of a rotor based on a square may vary from that shown precisely in FIG. 6.

Figure 8:
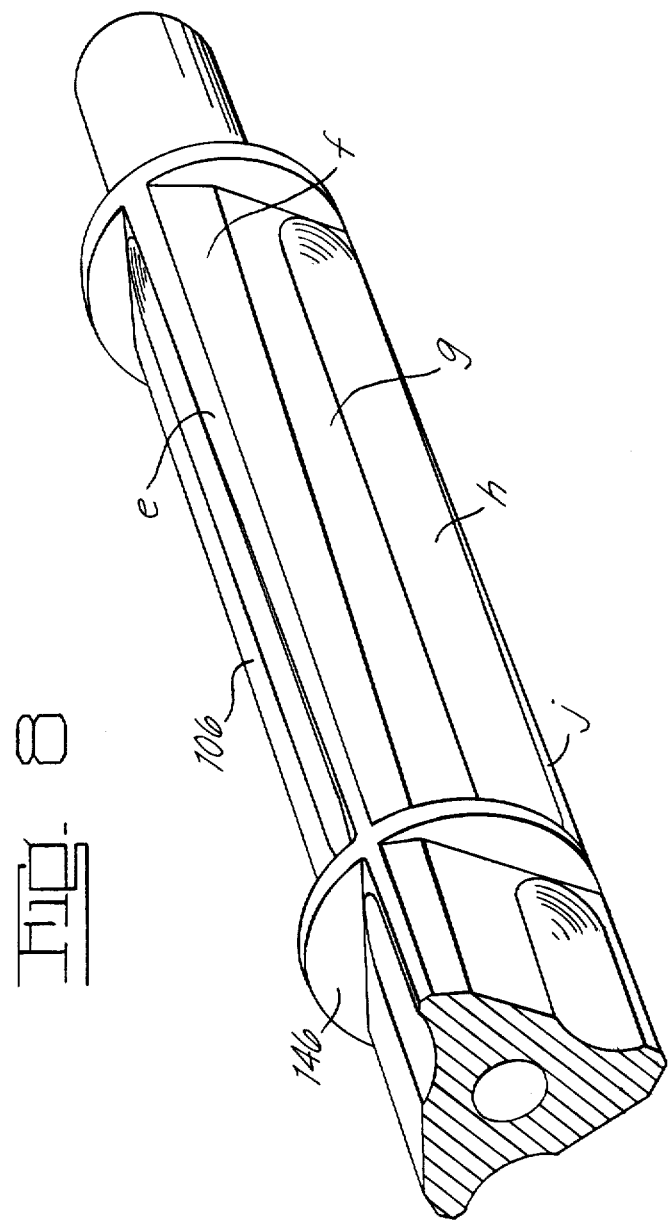
FIG. 8 is a perspective view of one of the rotors comprising an alternative embodiment of the mixing device.
Figure 9:
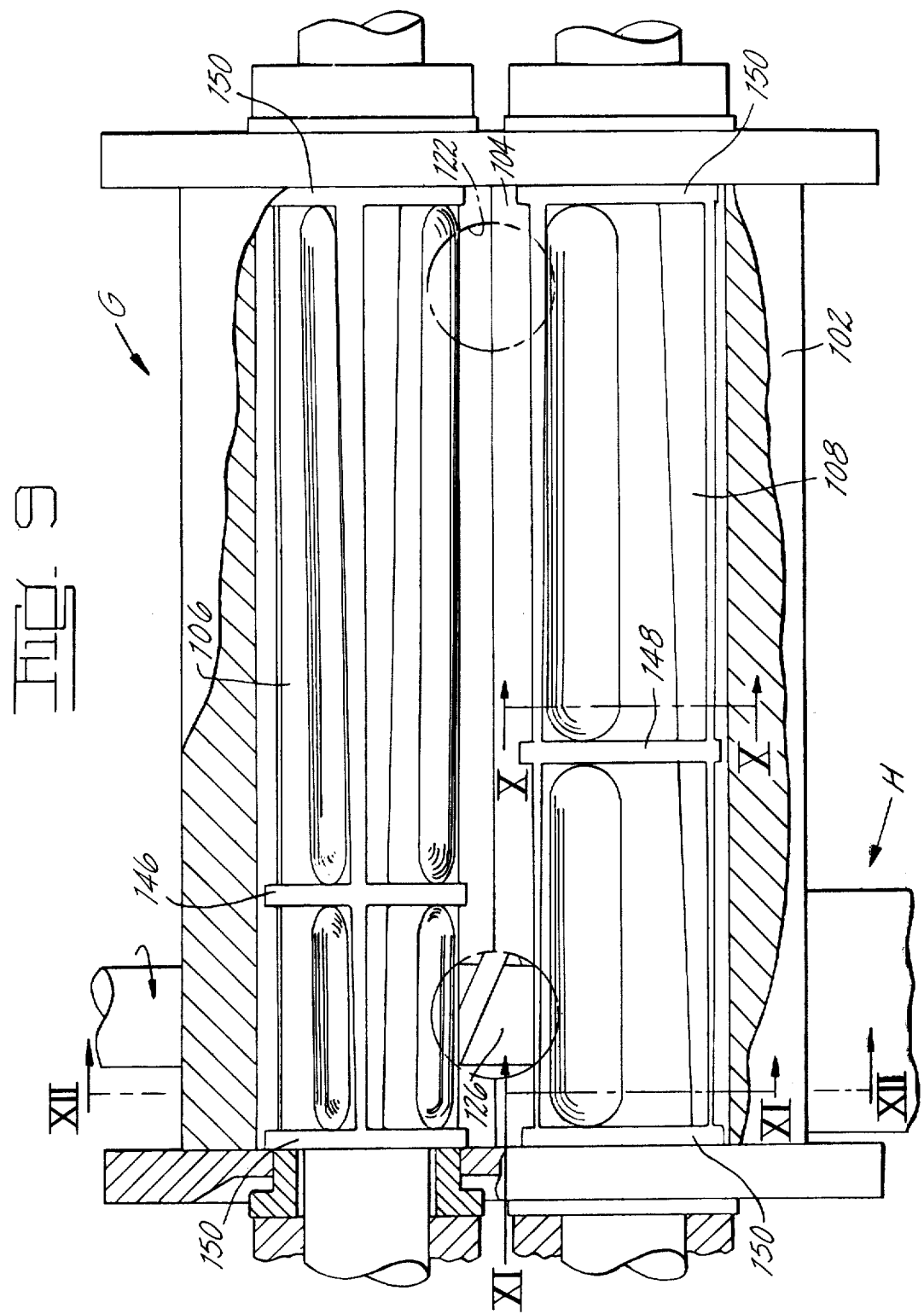
FIG. 9 is a plan view showing the alternative embodiment of the mixing device.

An alternative embodiment of the invention is shown in FIGS. 8 and 9, which comprises a mixing device G, comprising two rotors 106,108 each being without helical twist, but each having mixing sections of gradually reducing cross-sectional area so that the rotors taper from an inlet end portion of the mixing device G to an outlet end portion thereof. The rotors are mounted for rotation about parallel axes in a mixing chamber 104. The mixing device G includes a feeding device (not shown) similar to the feeding device B described in the aforementioned embodiment.

The mixing device G comprises a composite body portion 102 in which the mixing chamber 104 is formed, the mixing chamber beng gnererally "8" shaped and extending horizontally, the construction and configuration of the body portion 102 and mixing chamber 104 being similar to that of the body portion 2 and mixing chamber 4 described in the aforementioned embodiment. The rotors 106, 108 are supported for rotation in bearings and intermeshing gears (not shown) are arranged to drive the rotors 106, 108 in opposite directions at a ratio of 26:29.

Material to be processed by the alternative embodiment is supplied by the feeding device to an inlet passage 122 in the body portion 102, leading to the inlet portion of the chamber 104. An outlet passage 126 is provided in the lower portion of the body portion 102 and leads from the outlet end portion of the mixing chamber 104 to the extrusion device H.

Figure 10:
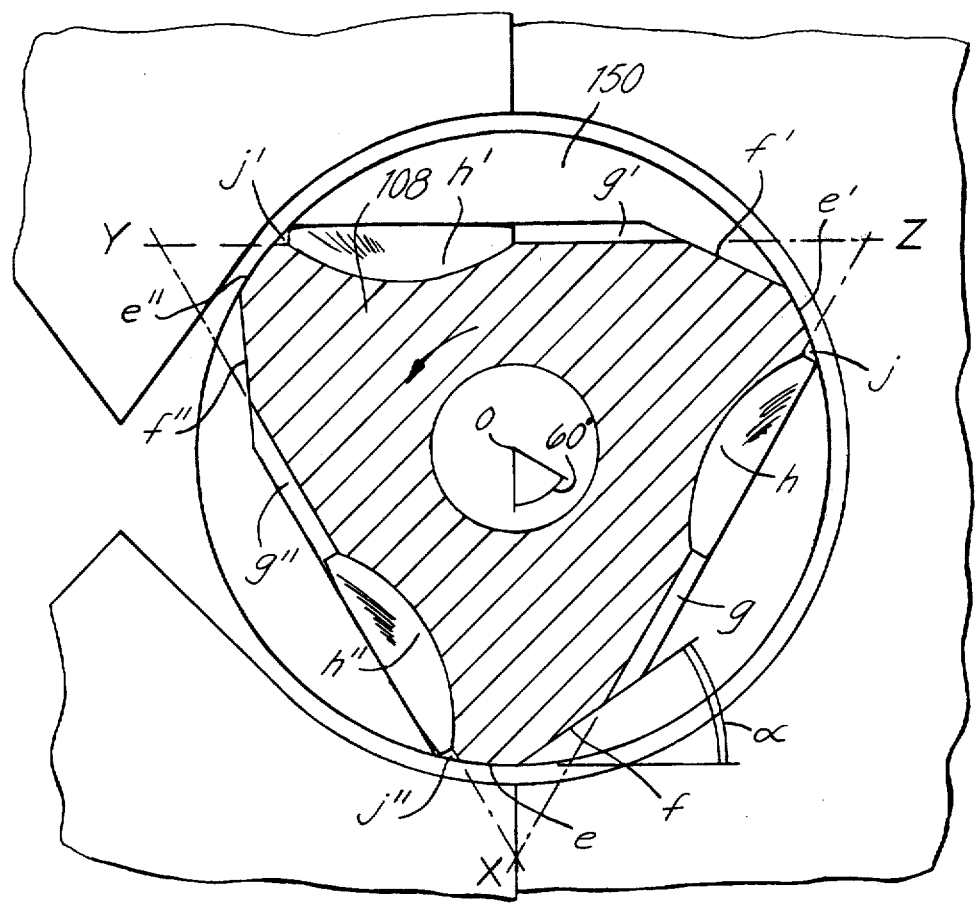
FIG. 10 is a view in cross-section on the line X — X of FIG. 9.
Figure 11:
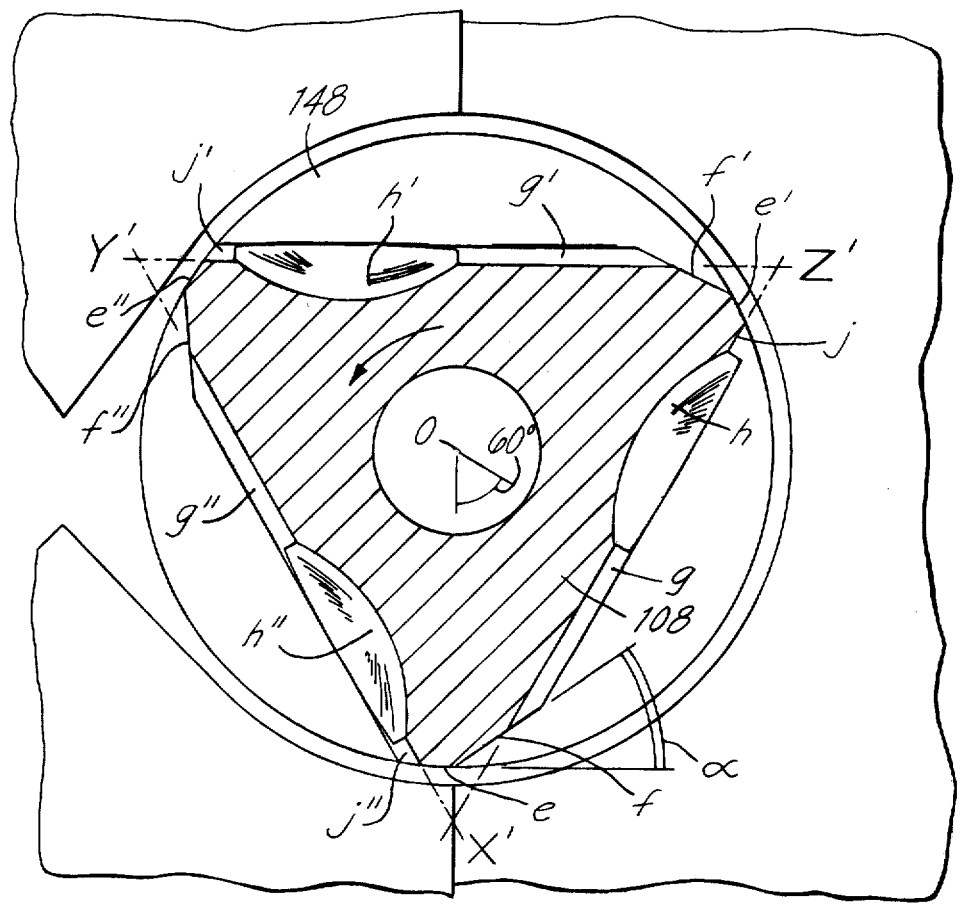
FIG. 11 is a view in cross-section of the line XI — XI of FIG. 9.
Figure 12:
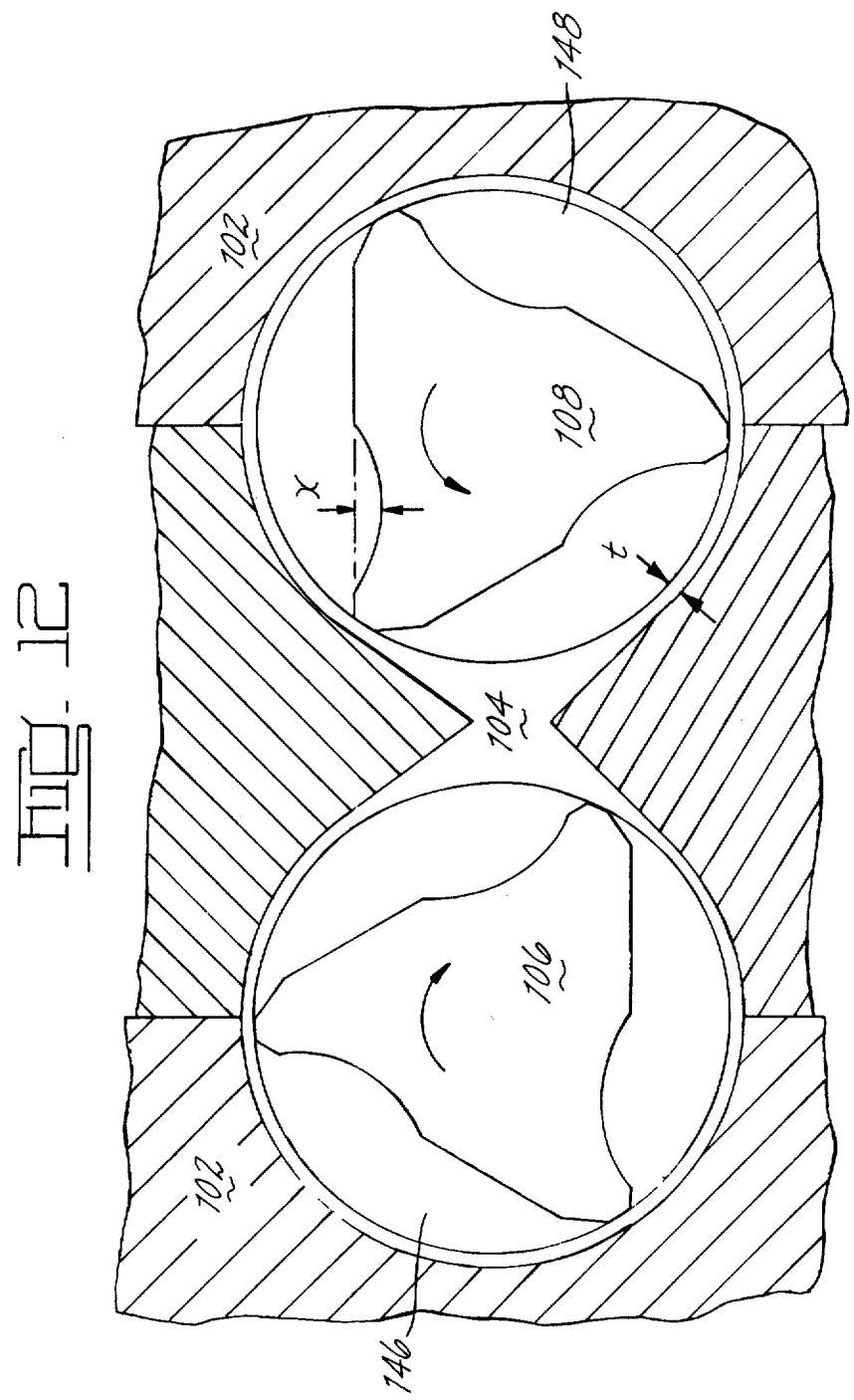
FIG. 12 is a view in cross-section on the line XII — XII of FIG. 9.

A cross-section through either of the rotors 106, 108, perpendicular to the axis of rotation of the rotor, is derived from an equilateral triangle. However, the area of the equilateral triangle is smaller, the closer the section is taken to the outlet end portion of the relevant rotor; the corresponding sides of all these rotational equilateral triangles are parallel with each other. FIGS. 10 and 11 show cross-sections of the rotor 108; each of these sections is derived from an equilateral triangle XYZ, X'Y'Z'. The section of the rotor shown in FIG. 10 is taken near the middle of the rotor 108 looking towards the inlet end portion, while the section shown in FIG. 11 is taken at the outlet end portion of the rotor. As can be seen from FIGS. 10 and 11, the area of the triangle XYZ is greater than the area of the triangle X'Y'Z'.

On any cross-section, the rotor comprises three similar peripheral portions $e f g h j$, $e' f' g' h' j'$, $e'' f'' g'' h'' j''$; however at sections at different points along the length of the rotor, the relative dimensions of the various parts is different. For example, the peripheral portion of the section shown in FIG. 10 (for convenience the sections $efghj$ will be referred to hereinafter with a suffix as "$e10$" where referring to the section as shown in FIG. 10 and "$e11$" where referring to the section shown in FIG. 11) which begins near the apex X comprises a first narrow section $e10$ which is circular about the axis 0 of the rotor. Joining the narrow section $e10$ is a second, leading, section $f10$, which is flat and which leads into the first section to provide an acute angle, $a$, between the section $f10$ and a tangent to $e10$ at the point where the two sections $e10$ and $f10$ both join. On the rotor 108, the angle $a$ is 25°. Joining the leading sections $f10$ is a third section $g10$ which, as can be seen, is provided by part of one of the sides of the triangle XYZ. In the rotor 108 the section $g10$ extends to a point which subtends an angle of 60° at the axis 0 with the line joining the axis 0 to the joining of $e10$ and $f10$ (that is the point bisecting the side XZ of the triangle XYZ). Extending from the section $g10$ towards the section $e10'$ of the next peripheral portion is a circular section $h10$ which provides a relieved section falling entirely within the periphery of the equilateral triangle XYZ. Extending from the circular section $h10$ to the section $e10'$ of the next peripheral portion is a fifth section $j10$ which is provided by part of one of the sides of the triangle XYZ.

The other two peripheral portions $e10' f10' g10' h10' j10'$ and $e10'' f10'' g10'' h10'' j10''$ are similarly arranged.

As can be seen by comparing FIGS. 10 and 11, the actual dimensions of the sections $e f g$ and $j$ change as one progresses along the rotor 108 from the inlet end portion to the outlet end portion. For example, the fifth section $j$ is very narrow at the inlet end portion and is in effect a line; however, as one progresses along the rotor 108 to the outlet end portion, the section $j$ becomes wider (see FIG. 11 in which $j11$ is part of the X'Z' of the triangle X'Y'Z' from which the cross-sectional shape of the rotor is derived at this section). The circular, relieved, section $h$ does not, however, change in dimension along the length of the rotor.

The cross-section of the rotor 106 at any point along its length is a mirror image of the cross-section of the rotor 108 at the corresponding point along its length.

The rotor 108, as shown in FIG. 9, comprises halfway along its length and dividing the rotor into two mixing sections, a circular dam 148 which is of a radius equal to that of the sections $e$, $e'$, $e''$ and is of uniform thickness. The rotor 106 comprises a dam 146 which divides the rotor 106 into two mixing sections, the section nearer the inlet passage 122 being about three times the length of the section near the outlet passage 126. Flanges 150, similar to the dams and at the ends of the two rotors, assist in providing end seals to the rotors.

In the mixing device G, the diameter of each rotor is about 2 ⅛ inches, the distance $t$ between the outer diameter of the rotors 106 and 108, and the inner circular surface of the chamber 104 is 1/16 inch, the closest distance of approach of the rotors is ⅛ inch and the length/diameter ratio of each rotor is about 4.4/1.

The following table provides an indication of the relative dimensions of the sections; it will be observed that the circular section $h$ of constant width whereas the dimensions of the other sections vary:

| | Approximate length of sections in inches | | | | |
|---|---|---|---|---|---|
| | e | f | g | h | j |
| FIG. 10 | 0.3 | 0.55 | 0.45 | 0.75 | 0 |
| FIG. 11 | 0.125 | 0.225 | 0.725 | 0.75 | 0.1 |

The depth of the circular section $h$ as indicated by the dimension 'x' (see FIG. 10), is about ⅛ inch.

When the mixing device G is in use, the two rotors, 106 and 108 are rotated in contrary directions as indicated in the drawings. Material to be mixed, for example polyethylene and pigment, is fed by the feeding device through the inlet passage 122 into the chamber 104 under a substantially constant pressure. The rotors 106 and 108 have no helical twist and the material introduced into the chamber 104 is therefore caused to travel along the chamber from the inlet passage 122 towards the outlet passage 126 as a result of the pressure exerted by the feeding means and a "squashing" action exerted on the material as the rotors 106, 108 rotate. The tapered form of the rotors from inlet to outlet portion of the mixing chamber facilitates the travel of the material along the mixing chamber 104 as a result of the "squashing" action. Once a steady state has been reached, the material passes slowly through the chamber to the outlet passage 126, which is filled, and the feeding of material out from the chamber 104 is determined by the take-up rate of the extrusion device.

By appropriate adjustment of the take-up rate of the extrusion device and the pressure of the feeding device, the extent to which the chamber 104 is filled with material can be determined. There is, in the present invention, only a very small tendency to pack material towards the outlet during the mixing operation and, as is the case with the apparatus described by way of example in the aforementioned embodiment, by adjusting the feed pressure the mixing device can be caused to operate leaving substantial voids in the mixing chamber 104 (the extent of which can be varied by adjusting the pressure exerted by the feeding device) to facilitate mixing and venting of gasses from the material in the chamber 104.

The mixing and plasticizing action of the rotors 106, 108 is understood to be similar to that of the first mentioned embodiment.

It is believed that in the mixing device G, material introduced through the inlet passage 122 into the chamber 104 is subjected to a maximum of shear in the inlet region (where the cross-sectional area of the rotors is greatest) which raises the temperature of the material rapidly and carries out much work; as the material progresses along the chamber towards the outlet passage 126, the amount of shear to which the material is subjected is gradually reduced. However, the additional free space in the chamber allows more free intermingling of the material which is facilitated by the dams 146, 148.

As discussed in the aforementioned embodiment, the first, narrow sections $e$ of the peripheral portions of the rotors 106, 108 are responsible for the shearing action effected by the rotors: a longer section $e$ will require a greater power input for the same rate of rotation because the amount of shearing will be greater. The angle at which each section $f$ meets the section $e$ is preferred to be 25°, as in the earlier embodiment, but provided that the section $f$ provides a wedgeshaped lead into the section $e$ the angle may vary between 5° and 45°.

It will be realized that the section $f$ has to be very short if the angle is as small as 5°.

As is the case with the rotors described in the aforementioned embodiment, the rotors 106, 108 of the invention are simpler and cheaper to manufacture than those for conventional plastics and rubber mixers because the cross-section of the rotors is without helical twist.

The faces on the rotors 106,108 can be simply formed by conventional straight-line machining operations, interrupted only by the dams, and the amount of complex machining and hand finishing is greatly reduced.

Whereas, the invention comprises rotors having a cross-section based on a regular polygon having three sides, namely an equilateral triangle, and defined in three dimensions as an elongated polyhedron having at least three planar sides, each planar side parallel with the axis of rotation of the rotor, and each planar side intersecting the other planar sides at equal angles. In large mixers it may be advantageous to have a rotor whose cross-section is based on a regular four-sided polygon, namely a square, in which the rotors gradually taper from the inlet to the outlet end.

The invention having thus been described, what is claimed as new and what it is desired to secure by Letters Patent of the United States is:

1. A through feed mixer comprising:
   at least two rotors mounted for rotation in opposite directions about generally parallel axes in a mixing chamber,
   each of said rotors comprising an elongated polyhedron extending axially in said mixing chamber,
   each of said elongated polyhedrons having apexes extending generally axially and being generally parallel with one another,
   a feeding device adapted to supply material to be mixed to an inlet and portion of said mixing chamber under a substantially constant pressure,
   each of said rotors having a cross-section at right angles to its axis of rotation which is derived from a regular n-sided polygon having similar peripheral portions, each peripheral portion including:
   a first, narrow section substantially circular about the axis of rotation of said rotor comprising the radially outermost portion of each of said apexes;
   a second leading section which leads into the first section to provide an acute angle between the second section and a circle defining the outer periphery of said rotor at that cross-section;
   a third section which is in part, at least, of one of the sides of the polygon; and
   a fourth relief section extending from the third section towards the first section of the next peripheral portion.

2. A through feed mixer as recited in claim 1, wherein each of said elongated polyhedrons extending axially in said mixing chamber has at least three sides, each side defining generally similar peripheral portions.

3. A through feed mixer as recited in claim 1, wherein each of said rotors are of gradually reducing cross-sectional area, from their inlet portion to their outlet portion.

4. A through feed mixer as recited in claim 1, wherein each of said rotors has at least one circular dam disposed therearound to divide each of said rotors into at least two mixing sections.

5. A through feed mixer as recited in claim 1, wherein each of said rotors rotate at a different speed from one another during operation of said mixer.

* * * * *